UNITED STATES PATENT OFFICE.

DATUS E. RUGG, OF NEW YORK, N. Y.

METHOD OF PREPARING ARTIFICIAL GUMS FOR DENTAL WORK.

SPECIFICATION forming part of Letters Patent No. 439,305, dated October 28, 1890.

Application filed March 14, 1890. Serial No. 343,903. (No specimens.)

*To all whom it may concern:*

Be it known that I, DATUS E. RUGG, a citizen of the United States, residing at the city and State of New York, have invented an Improvement in the Method of Preparing Artificial Gums for Dental Work, of which the following is a specification.

Artificial teeth have heretofore been united in two or more sections and provided with a vitrified surface in imitation of the natural gum, and these teeth have either been fastened to metallic plates or else they have been received into plates formed of rubber vulcanized and fitting the roof of the mouth, and in many instances the teeth are set into the rubber, which is vulcanized without any vitrified imitation gum-work. In cases where the vitrified imitation gum-work is made use of the high heat necessary renders it almost impossible to make use of other metallic plates than those formed from platinum, and where teeth are set into hard rubber such rubber does not imitate the natural gum because the same is of a uniform color throughout, while the natural gum is more or less mottled or varied in color in different portions of such gum adjacent to the teeth.

The object of the present invention is to manufacture an imitation of the natural gum in hard rubber.

In carrying out my invention I take the ordinary dentists' rubber in an unvulcanized condition, and by a mixture of the white rubber and the pink rubber, or with an addition of the red or vermilion rubber, I make an imitation of the general color of the gums of the person whose mouth is to be fitted with a roof-plate and teeth, taking care that the color is lighter than that of the natural gums, and these colors are rolled or worked together in the ordinary manner; and I make use of the red vulcanized rubber in the form of fine shavings scraped off of the hard red rubber, or fine particles of the same produced by filing, and these small pieces of the vulcanized red rubber are intimately mixed in with the pink rubber, so that such rubber as a whole assumes approximately the color of the natural gum and it is packed in its soft condition into the mold and around the base of the teeth in the usual manner, and then closely confined by closing the mold and vulcanizing under the proper degree of heat and pressure, the result of which is that the particles of red rubber melt and assimilate with the pink rubber in such a manner as to produce a mottled appearance similar to the natural gum, thereby obviating the objectionable appearance of either the pink rubber or the red rubber and rendering it unnecessary in the finer class of dental work to employ the vitrified enamel at the base of the teeth.

I do not claim mixing uncured rubber of different colors to produce the desired tints or colors, and I am aware that articles have been made of crude rubber of different colors associated together before vulcanizing.

I claim as my invention—

The method herein specified of manufacturing hard-rubber gum-work for artificial teeth, consisting in mixing white and pink rubber to a color lighter than the natural gum and introducing into such mixture fine particles of vulcanized red rubber, packing the same around the teeth and vulcanizing, substantially as set forth.

Signed by me this 7th day of February, 1890.

DATUS E. RUGG.

Witnesses:
GEO. T. PINCKNEY,
HAROLD SERRELL.